United States Patent [19]

Tanaka et al.

[11] Patent Number: 4,543,572
[45] Date of Patent: Sep. 24, 1985

[54] ROAD MAP DISPLAY SYSTEM WITH INDICATIONS OF A VEHICLE POSITION AND DESTINATION

[75] Inventors: Haruto Tanaka; Kiyoshi Yamaki; Hidetaka Suzuki, all of Yokohama, Japan

[73] Assignee: Nissan Motor Company, Limited, Yokohama, Japan

[21] Appl. No.: 373,168

[22] Filed: Apr. 29, 1982

[30] Foreign Application Priority Data

May 13, 1981 [JP] Japan .................................. 56-70781

[51] Int. Cl.⁴ .................................................. G09G 1/08
[52] U.S. Cl. ...................................... 340/723; 340/721; 340/750; 340/995; 364/449
[58] Field of Search ............... 340/723, 727, 286 M, 340/721, 750, 744, 748, 995, 998; 364/449, 460

[56] References Cited

U.S. PATENT DOCUMENTS

| | | | |
|---|---|---|---|
| 3,520,994 | 7/1970 | McAfee et al. | 340/721 |
| 3,521,228 | 7/1970 | Congleton | 340/727 X |
| 3,668,622 | 6/1972 | Garrett | 340/727 X |
| 3,760,360 | 9/1973 | Reynolds | 340/286 M X |
| 3,783,542 | 1/1974 | Johnson | 340/286 M X |
| 3,821,729 | 6/1974 | Schultze | 340/727 |
| 3,906,197 | 9/1975 | Groves | 340/286 M X |
| 3,925,765 | 12/1975 | Berwin | 340/727 X |
| 3,967,266 | 6/1976 | Roy | 340/723 X |
| 4,024,493 | 5/1977 | Ingels | 340/286 M X |
| 4,086,632 | 4/1978 | Lions | 340/286 M X |
| 4,138,726 | 2/1979 | Girault et al. | 340/995 |
| 4,149,148 | 4/1979 | Miller et al. | 340/721 |
| 4,225,929 | 9/1980 | Ikeda | 340/727 X |
| 4,267,555 | 5/1981 | Boyd | 340/727 X |
| 4,271,476 | 6/1981 | Lotspiech | 340/727 X |
| 4,305,057 | 12/1981 | Rolston | 340/723 X |
| 4,312,577 | 1/1982 | Fitzgerald | 340/286 M X |
| 4,317,114 | 2/1982 | Walker | 340/721 |
| 4,360,876 | 11/1982 | Girault et al. | 340/995 |
| 4,366,475 | 12/1982 | Kishi et al. | 340/730 |
| 4,384,286 | 5/1983 | DiToro | 340/727 |
| 4,398,171 | 8/1983 | Dahan et al. | 340/734 X |
| 4,400,727 | 8/1983 | Aron | 358/103 |
| 4,400,780 | 8/1983 | Nagao et.al. | 364/449 |

FOREIGN PATENT DOCUMENTS

| | | |
|---|---|---|
| 0059435 | 9/1982 | European Pat. Off. . |
| 3213630 | 11/1982 | Fed. Rep. of Germany . |
| 2100001 | 12/1982 | United Kingdom . |

Primary Examiner—Marshall M. Curtis
Assistant Examiner—Vincent P. Kovalick
Attorney, Agent, or Firm—Lane, Aitken & Kananen

[57] ABSTRACT

A road map display system comprises a map memory for storing map image data, a sensor for detecting the travelling distance and travelling direction and outputting a signal representative of the angular offset between the direction of travel and an axis of a map coordinate system, an arithmetic means for calculating the map coordinates of a point halfway between the vehicle position and the destination, a coordinate transforming means which transforms the map image data to a display coordinate system, the origin of which lies halfway between the vehicle and the destination and the y-axis of which lies parallel to the direction of travel, a display memory in which the map data and symbols representing the destination and the position and the direction of travel of the vehicle are stored in terms of the display coordinate system, and a display means displaying the information stored in the display memory on the display screen.

12 Claims, 20 Drawing Figures

ROAD MAP DISPLAY SYSTEM WITH INDICATIONS OF A VEHICLE POSITION AND DESTINATION

BACKGROUND OF THE INVENTION

The present invention relates generally to a road map display system for displaying a road map and symbols representing the positions of a vehicle and a designated destination on a screen. More particularly, the invention relates to a road map display system which displays the relationship between the vehicle position and destination and updates the display according to the movement of the vehicle.

A display system for displaying the road map and the vehicle position on the display road can help the vehicle driver find his way. A pilot system for a ship is disclosed in the first publication of the Japanese Patent Application Sho 52-159895 (Tokkai Sho 54-89767, published July 17, 1979). In this publication, there is shown a method for displaying a sea chart with an indication of the ship position. The sea chart is moved on the display according to the travelling distance and travelling direction of the ship. In this system, coordinates of the displayed sea chart are modified with respect to the position and travelling direction of the ship. The sea chart is stored in a digital memory as plotted coordinates. A microcomputer is used for processing modifications of the sea chart coordinates and for calculation of the ship position based on a sensor, which measures travelling distance and detects the direction of the ship.

On the other hand, in the automotive vehicle field, Tokkai Sho 52-141662, published on Nov. 26, 1977, shows a map display system for an automotive vehicle. In this system, microfilm is used to store the map. In this system, the indication of the vehicle position will move in accordance with the travelling distance and travelling direction of the vehicle.

In such road map display systems for automotive vehicles, it is convenient to display symbols for both the vehicle and the destination on the displayed map. It would be even more convenient to display the relationship between the vehicle and the destination by displaying the map on a coordinate system centered between the vehicle position and the destination. Also, the displayed map would be most easily legible if the y-axis of the display coordinate system were always parallel to the travelling direction of the vehicle.

SUMMARY OF THE INVENTION

Therefore, it is an object of the present invention to provide a road map display system having indications of the vehicle position and a destination on the displayed map.

Another and more specific object of the present invention is to provide a road map display system having a display coordinate system centered between the vehicle position and the destination so that the relationship between the vehicle position and the destination can be readily understood.

To accomplish these and other objects, a road map display system is provided which comprises a map memory for storing map data, a sensor for detecting the travelling distance and travelling direction of a vehicle and outputting a signal representative of the rotation angle through which the map is rotated, an arithmetic means for calculating the coordinates of a point intermediate between the vehicle position and the destination, a coordinate transforming means which transforms the map data and the display coordinates of a mark representing the destination in accordance with the rotation angle so that the intermediate point coincides with a predetermined position on a display screen and a mark representing the present position and orientation of the vehicle facing a predetermined direction, a display memory in which the map image in the transformed coordinate system, the vehicle mark, and the destination mark are stored, and a display means for displaying the information stored in the display memory on the display screen.

In principle, the road map display system according to the present invention displays a road map stored in a map memory with symbols representing the positions of the vehicle and its destination. On the display, the vehicle mark always points upward along the y-axis of the screen to show the travelling direction. For this purpose, the display coordinate system is transformed from time to time according to changes in the travelling direction. Further, the display center always coincides with a point intermediate between the vehicle position and the destination to clearly illustrate the remaining distance to the destination and the current heading of the vehicle.

According to one embodiment, a road map display system for an automotive vehicle comprises a first memory storing map data in a first map coordinate system, a first sensor for monitoring vehicle position in terms of the first map coordinate system and producing a first sensor signal representative of the detected vehicle position coordinates, a second sensor for detecting vehicle travelling direction and producing a second signal representative of an offset angle of the detected direction with respect to the first map coordinate axes, first means for determining the coordinates of a destination and producing a third signal representative of the determined destination coordinates, second means for determining the center of a second coordinate system in accordance with the first sensor signal and the third signal and aligning the y-axis of the second coordinate system parallel to the vehicle traveling direction, third means for transforming the map data in the first memory with respect to the second coordinate system, a second memory storing the transformed map data, and fourth means, incorporating a display screen, for displaying the map data according to the stored map data in the second memory and the first and third signals so as to illustrate the positions of the vehicle and its destination.

According to another embodiment, a method for displaying a road map with superimposed symbols representing the positions of a vehicle and a designated destination comprises the steps of storing first map image data of the road map in a first coordinate system, detecting the position and travelling direction of the vehicle in the first coordinate system and producing a first signal representative of the vehicle coordinates in the first coordinate system, inputting coordinates of a destination in the first coordinate system, determining a second coordinate system based on determined vehicle position, vehicle travelling direction and the destination coordinates, one axis of which is parallel so that the second coordinate system is rotated to be parallel to the travelling direction and the origin of which is centered on a point intermediate between the vehicle position and the destination, transforming the first map image data to the second coordinate system to obtain second map image data, and displaying the second map image data on the display screen in conjunction with symbols representing the positions of the vehicle and the destination.

BRIEF DESCRIPTION OF THE DRAWINGS

The invention will be understood more fully from the detailed description given herebelow and from the accompanying drawings of the preferred embodiment of the present invention, which, however, should not be taken as limitative to the invention but are for explanation or elucidation only.

In the drawings.

DETAILED DESCRIPTION OF THE PREFERRED EMBODIMENT

Figure 1:
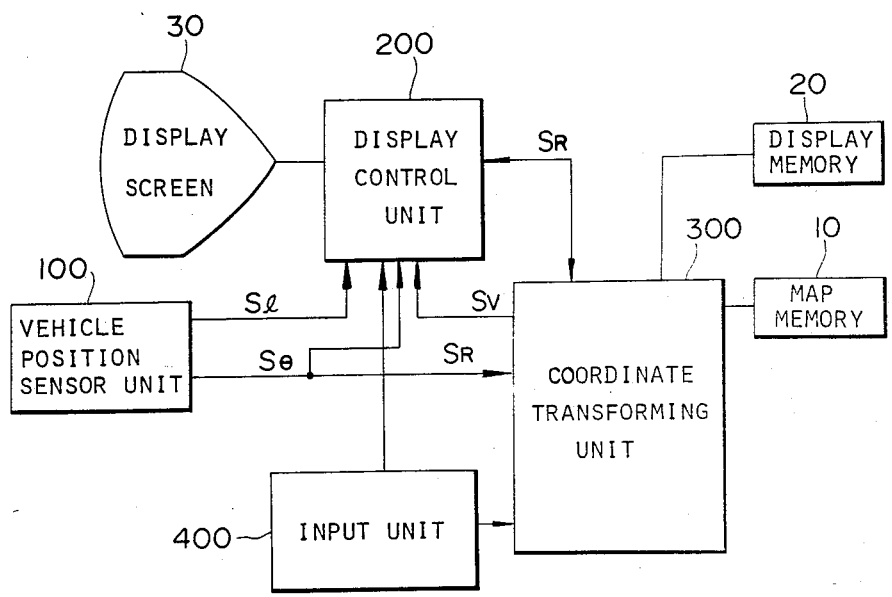
FIG. 1 is a schematic block diagram of the first embodiment of a map display system according to the present invention.

Referring now to the drawings, FIG. 1 illustrates the general structure of the preferred embodiment of a map display system according to the present invention. A road map is stored in a map memory 10. The map memory 10 is a digital memory unit for storing digitalized map data. Each map datum represents a corresponding point on a road map. The map data in the map memory 10 is transferred to a display memory 20 via a coordinate transforming unit 300. The display memory 20 is adapted to temporarily store the map data to be displayed on a display screen 30. The data stored in the display memory 20 are read out and transferred to a display control unit 200 via the coordinate transforming unit 300. The display control unit 200 controls transfer of map data from the map memory 10 to the display memory 20 and from the display memory 20 to the display screen 30.

A vehicle position sensor unit 100 is connected to the display control unit 200. The vehicle position sensor unit 100 is adapted to detect a distance travelled by the vehicle from a starting point and a travelling direction of the vehicle with respect to the coordinate axis of the map stored in the map memory. The vehicle position sensor unit 100 produces a travelling distance signal $S_l$ and a travelling direction signal $S_\theta$ respectively having values representative of the distance travelled by the vehicle and the angular offset of the travelling direction of the vehicle with respect to the map coordinates. The vehicle position sensor unit 100 is further connected to the coordinate transforming unit 300 for providing the display with coordinate axes aligned with the vehicle direction. The travelling direction signal $S_\theta$ is fed to the coordinate transforming unit 300 so that the map data in the display memory 20 to be displayed on the display screen are transformed such that the map coordinate y-axis lies parallel to the vehicle direction.

The coordinate transforming unit 300 is further connected to an input unit 400 which comprises a pair of joy sticks for controlling cursors, one of which is movable in the vertical direction on the display screen for determining the x-axis coordinate of the vehicle position and a destination in the map coordinates in the map memory. The other joy stick is movable in the horizontal direction on the display screen to determine the y-axis coordinate of the vehicle position and the destination. Given the position of the destination determined by the input unit 400 and the vehicle position and travelling direction detected by the vehicle position sensor unit 100, the coordinate transforming unit 300 determines the coordinate axes of the map to be displayed in relation to the map coordinate axes of the map memory.

The coordinate transforming unit 300 sequentially transforms the coordinates of each of the map data in order to convert the coordinates of the map data to the determined display coordinate for display on the display screen 30. As the vehicle moves, the vehicle position sensor unit 100 periodically produces the travelling distance signal $S_l$ and the travelling direction signal $S_\theta$ according to the vehicle movement. The display control unit 200 receives the travelling distance signal $S_l$ and the travelling direction signal $S_\theta$ and processes them to determine the coordinates of the current vehicle position. The display control unit 200 produces a vehicle position signal $S_v$ representative of the x-coordinate and y-coordinate of the vehicle in the display coordinates at given intervals. The vehicle position signal $S_v$ thus contains a x-component and a y-component respectively representative of the x-coordinate ($x_v$) and y-coordinate ($y_v$) of the vehicle position and is fed to the coordinate transforming unit 300. The coordinate transforming unit 300 also receives the travelling direction signal $S_\theta$ from the vehicle position sensor unit 100. Based on the vehicle position signal $S_v$, a rotation signal $S_r$ and the preset destination identified by x- and y-coordinates in the display coordinates, the coordinate transforming unit 300 calculates the displacement of the display center and shifts and rotates the axes of the coordinates to align the y-axis of the coordinates with the vehicle travelling direction. According to this translation and rotation of the display axes, the map data are transformed by the coordinate transforming unit 300.

Figure 2:
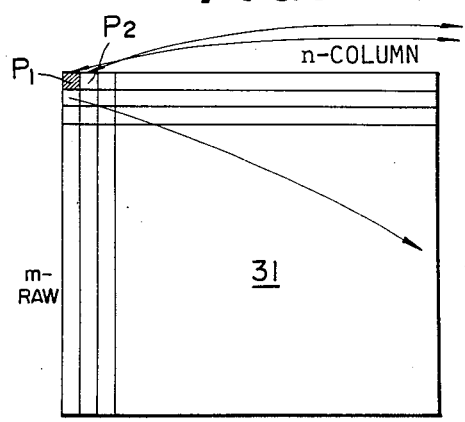
FIG. 2 is a diagram of a display screen of the map display system of FIG. 1.
Figure 3:
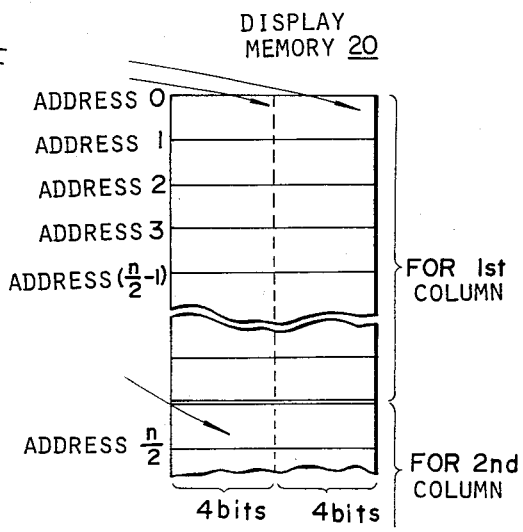
FIG. 3 is an illustration of a display memory in the system of FIG. 1.
Figure 4:
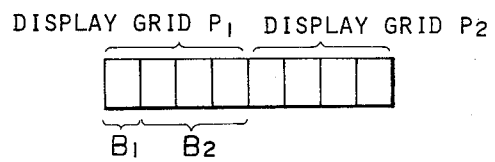
FIG. 4 is an enlarged illustration of the display memory of FIG. 3, in which the contents of each address in the display memory are shown.

Assuming the display screen consists of a grid of pixels $p_1, p_2 \ldots$ of m rows and n columns, as shown in FIG. 2, the datum of each pixel $p_1, p_2 \ldots$ will be stored in the display memory 20. The display memory 20 consists of a plurality of memory addresses, as shown in FIG. 3. Each address of the display memory 20 consists of 8 bits (1 byte) of storage. Each address holds the data for a horizontal pair of pixels, e.g., $p_1$ and $p_2$. FIG. 4 shows the content of the address 0 of FIG. 3, in which the first four bits store data for pixel $p_1$ and the last four bits store data for pixel $p_2$. In the embodiment shown, the first bit of each four-bit nibble indicates whether or not the corresponding pixel is to be illuminated at all and the other three bits identify the color to be displayed.

In practice, if the value of the first bit of a nibble is "0", the pixel is not illuminated and serves only as background and if the first bit is "1", the grid displays a point on the map. As shown in FIG. 3, the addresses of the display memory store display data for corresponding pixels on the display screen 30. The specific example illustrated uses a color Braun tube for displaying the map. Therefore, identification of the color to be displayed requires three bits of color data. However, it is possible to use a monochromatic display screen. In the case of a monochromatic display screen, each address will specify the presence or absence of road data in eight corresponding pixels on the display screen 30.

Similarly, the map memory 10 consists of a plurality of memory addresses storing display data and organized with respect to map coordinates. As disclosed with regard to the display memory, the map memory 10 also stores the map data in sequence as digital data.

In the preferred embodiment, the center of the display map is taken to be a point halfway between the vehicle position and the destination, and the y-axis of the display coordinates always lies parallel to the travelling direction of the vehicle. Assuming the vehicle position coordinates are $x_v$ and $y_v$ and the coordinates of the destination are $x_d$ and $y_d$, and the offset of the vehicle travelling direction with respect to the map coordinates in the map memory (in which the y-axis points toward the North Pole is $\theta$, the origin of the display coordinate system at the center of the display can be obtained from the following equations:

$$x_0 = \frac{x_d + x_v}{2}$$

$$y_0 = \frac{y_d + y_v}{2}$$

Therefore, assuming the coordinates of a map point $P_a$ to be $x_a$ and $y_a$ in the map coordinates of the map memory 10, the coordinates will be transformed with respect to the display coordinates by the following equations:

$$x_a' = (x_a - x_0) \cos \theta - (y_a - y_0) \sin \theta$$
$$= \left(x_a - \frac{x_d + x_v}{2}\right) \cos \theta - \left(y_a - \frac{y_d + y_v}{2}\right) \sin \theta$$

$$y_a' = (x_a - x_0) \sin \theta + (y_a - y_v) \cos \theta$$
$$= \left(x_a - \frac{x_d + x_v}{2}\right) \sin \theta + \left(y_a - \frac{y_d + y_v}{2}\right) \cos \theta$$

Figure 5:
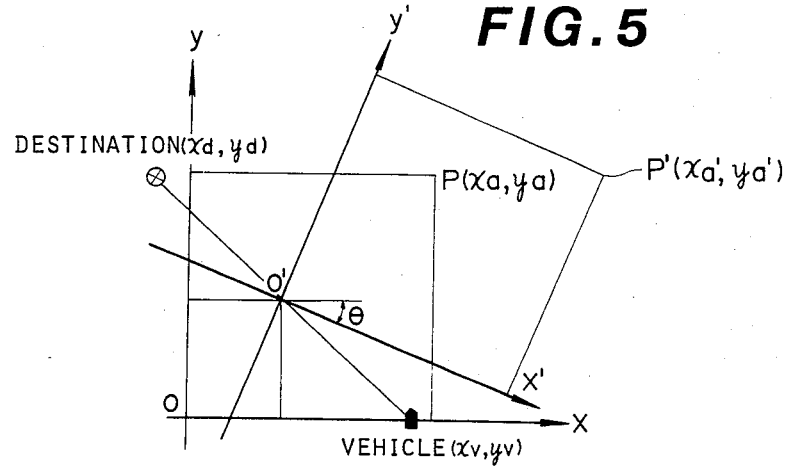
FIG. 5 illustrates transformation of the map coordinates.

According to the foregoing equations, the coordinate transforming unit 300 transforms the coordinates of each point of the map to be displayed to the display coordinates as shown in FIG. 5. The transformed map data are stored in the corresponding address in the display memory. As apparent herefrom, the transforming operation in the coordinate transforming unit 300 is repeated m x n times in order to find the map data corresponding to each displayed pixel.

Figure 6:
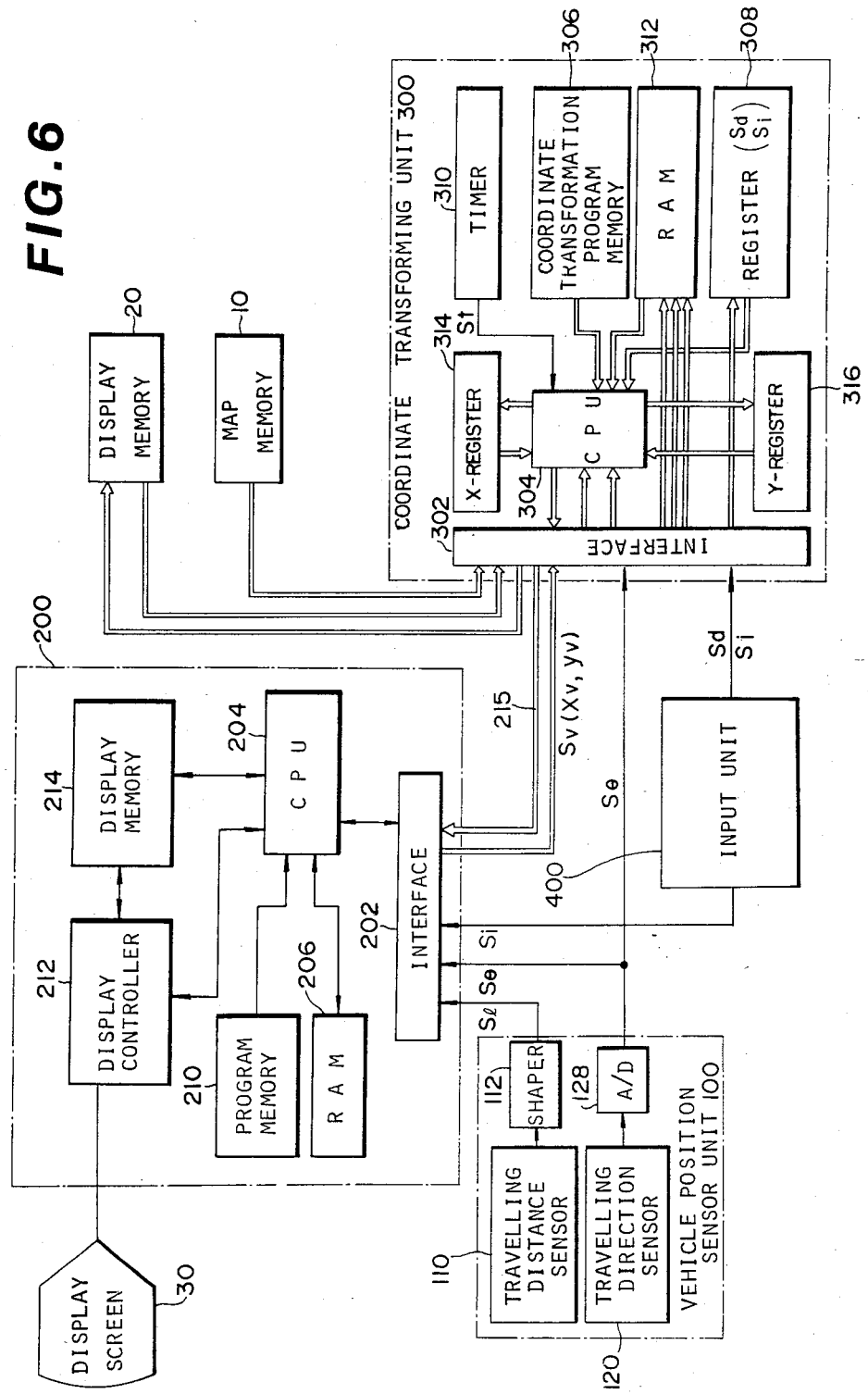
FIG. 6 is a more detailed block diagram of the drive map display system of FIG. 1.

FIG. 6 shows the map display system of the preferred embodiment in more detail for better understanding. The vehicle position sensor unit 100 comprises a travelling distance sensor 110 and a travelling direction sensor 120. The travelling distance sensor 110 is disposed opposite the vehicle axle (or a wheel of the vehicle) and generates a pulse for each fixed amount of rotation of the vehicle axle. The pulse signals are fed to a signal shaper 112 and subsequently to the display control unit 200. The signals from the shaper 112 are vector summed to provide an indication of the vehicle travel distance. On the other hand, the travelling direction sensor 120 can comprise any of a number of appropriate devices such as a terrestrial magnetic compass, gyrocompass, gyroscope or so forth. An example of the type of travelling direction sensor specifically suitable for automotive use is set forth in the SAE Paper SP-80/458/S02.50, published by Society of Automotive Engineering, as No. 800123, written by H. Ito et al or 3-Axis Rate Gyro Package Parts No. PG24-N1, illustrated in an Instruction Manual thereof of K. K. Hokushin Denki Seisakusho, February, 1979, both of which references are incorporated herein by reference. In the former reference, two coil sensors are used to generate $v_x$ and $v_y$ component direction signals. The y coil may be aligned with vehicle direction so that the angle $\theta$, given by the arctangent ($v_x/v_y$) is representative of the direction of the vehicle relative to magnetic north. An A/D converter 128 is used to digitize the signals $v_x$ and $v_y$, which signals are collectively represented in FIG. 2 by $S_\theta$.

Figure 7:
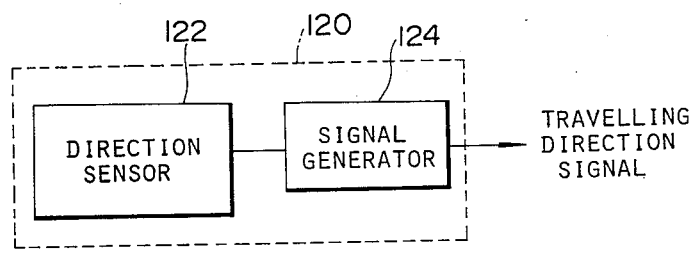
FIG. 7 is a schematic block diagram of the travel direction sensor of FIG. 6.
Figure 8:
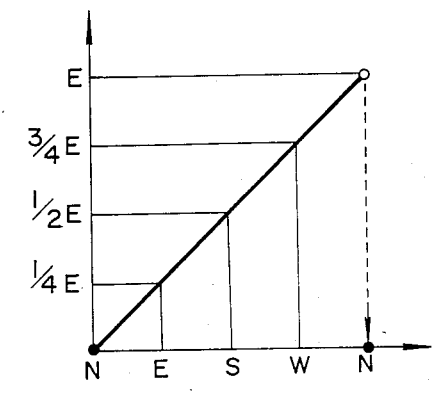
FIG. 8 is a graph of the relationship of the output of the travel direction sensor of FIG. 7 and the direction of travel of the vehicle.
Figure 9:
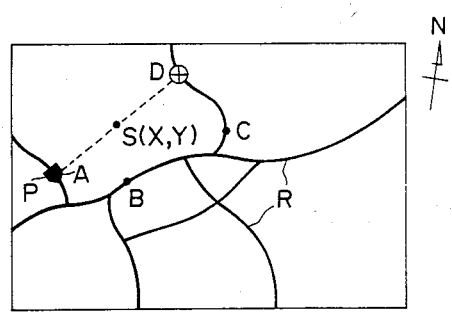
FIG. 9 is an illustration of the display screen showing the initial state of the display with initial indications of the vehicle position and the destination.

As shown in FIG. 7, the travelling direction sensor 120 of the preferred embodiment comprises a direction sensor 122 and a signal generator 124. The direction sensor 122 comprises a gyroscope which is well known. The output of the sensor 122 is inputted to the signal generator 124. The signal generator 124 produces a travelling direction signal which is an analog signal having a value representative of displacement of the vehicle travelling direction with respect to the North Pole. FIG. 8 shows the relationship between the angular deviation from true north and the signal value of the travelling direction signal. Namely, as apparent from FIG. 8, the signal value increases as the travelling direction shifts clockwise relative to true north.

As shown in FIG. 6, the travelling distance signal (pulses) $S_l$ and the travelling direction signal $S_\theta$ are inputted to an interface 202 and stored in a RAM 206 by a CPU 204. The CPU 204 operates under program control to calculate the distance travelled by vector summing the distance pulses with respect to the direction data from $S_\theta$. It may be assumed that for relatively small distances, the direction data $S_\theta$ is constant so that, for example, ten $S_l$ pulses may be summed for a fixed $S_\theta$ without appreciable error. The CPU 204 thus calculates the angle data $\theta$ from the signals $S_\theta$ and then performs the following sums over a fixed, small number of $S_l$ pulses, $$x_v = s_i + \{(S_l \cdot \cos \theta)$$

$$x_v = y_i + \{(S_l \cdot \sin \theta)$$

where $(x_i, y_i)$ represents the initial map position of the vehicle, input via the input unit 400 and $(x_v, y_v)$ represents the current position of the vehicle. These sums are added to the initial values and new sums are found for an updated $\theta$ and the new values are added to the previously calculated $(x_v, y_v)$ and so forth, so that the vehicle position is updated continuously. Based on the results of the vehicle position calculation, the central processing unit 204 produces a signal representative of the coordinates $(x, y)$ of the vehicle position in the map coordinates, which signal is hereafter referred to as the vehicle position signal $S_v$. The vehicle position signal $S_v$ is fed to the coordinate transforming unit 300 via the interface 202. The vehicle position signal $S_v$ is then inputted to an interface 302 of the coordinate transforming unit 300. The travelling direction signal $S_\theta$, representative of the rotational angle of the display coordinates, is also inputted to the interface 302. Based on the vehicle position signal $S_v$ and the travelling direction signal $S_\theta$, a central processing unit 304 of the coordinate transforming unit 300 executes a coordinate transforming program which is stored in a coordinate transformation program memory (ROM) 306. To the coordinate transforming unit 300, signals representative of the initial coordinates and the coordinates $(x_d, y_d)$ of the destination are inputted, which signals are referred to hereafter as $S_i$ and $S_d$. The signals $S_i$ and $S_d$ are fed to a register 308 in the coordinate transforming unit 300 via the interface 302.

The central processing unit 304 is associated with a timer 310 and periodically executes the coordinate transformation program in accordance with the formulas set forth above. The transformed data is stored in the display memory 20 and is periodically updated to take into account the current vehicle position. The address locations of the display memory 20 correspond to the address locations of the display memory 214 in the display control unit 200. These address locations in turn correspond to the n x m columns and rows for data to be displayed on the display screen 30.

Figure 10:
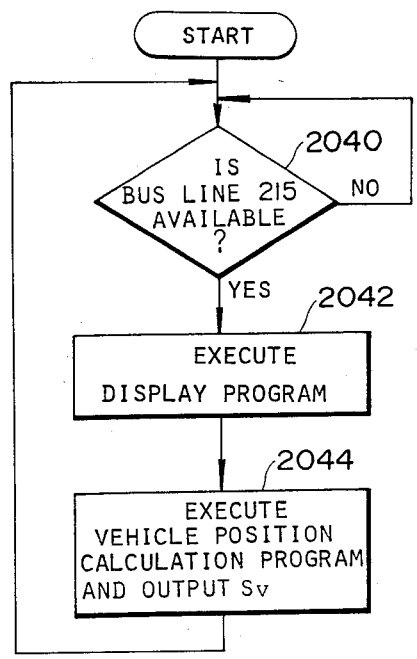
FIG. 10 is a flowchart of the operation of a display control unit in the drive map display system of FIG. 1.

The operation of the display control unit 200 will be described herebelow with reference to FIGS. 10 to 12. FIG. 10 shows a flowchart for execution by the central processing unit 204. In the first block 2040 after starting, bus line 215 is checked to see if it is busy. If it is busy, the program loops to repeatedly effect checking at the block 2040 until the bus line 215 becomes available. When the bus line 215 is available, the display program in the program memory 210 is executed at a block 2042. By execution of the display program, transformed map data is transferred to the display memory 214 from the display memory 20 and the data are displayed on the display screen 30. The display on screen 30 and data transfer operation from the memory 20 to the memory 214 may be interleaved line by line updating the display memory 214 without producing visual interference with the screen display data.

Figure 11:
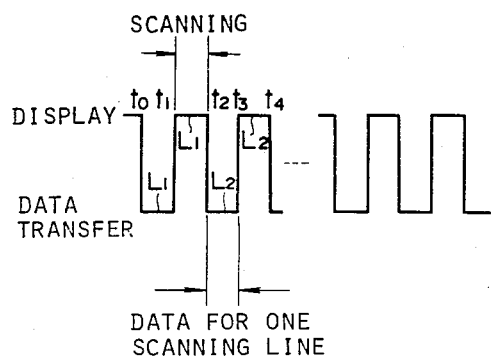
FIG. 11 is a timing chart showing the timing of the transfer of the map data to a display control unit.

FIG. 11 shows the timing of such a line-by-line operation. Between the time $t_0$ and $t_1$, the first display line $L_1$ of data is transferred from the display memory 20 to the display memory 214 via the interface 302, the bus line 215, the interface 202, and the CPU 204. This data are stored in the memory 214 and displayed by the display controller 212 during the time period between $t_1$ and $t_2$. The process is repeated for $L_2$ transfer during the time period between $t_2$ and $t_3$ and $L_2$ display during the time period between $t_3$ and $t_4$.

Alternately, the data transfer between the memory 20 and the memory 214 can take place without interleaving the display.

Returning to FIG. 10, after execution of the block 2042, the central processing unit 204 executes the vehicle position calculation program at a block 2044. The vehicle position processing program generally processes the travelling distance signal $S_l$ and travelling direction signal $S_\theta$ to obtain the coordinates $S_v(x_v, y_v)$ of the foregoing vector sum equations. Thereafter, the program in FIG. 10 returns to the initial block 2040.

Figure 12:
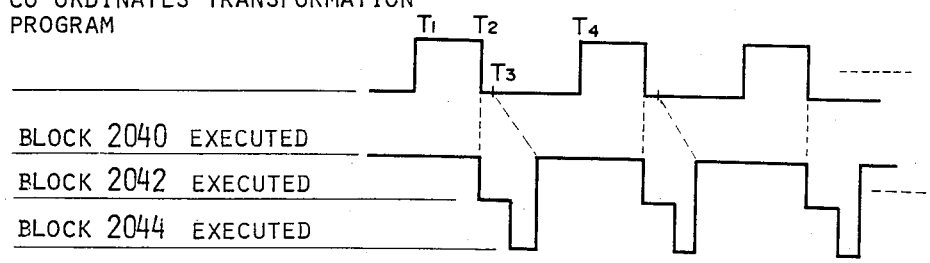
FIG. 12 is a timing chart showing the relationship between the display control unit operation and a coordinate transformation program executed in a coordinate transforming unit of FIG. 1.

The execution of the programs in the central processing unit 204 and the operation of the central processing unit 304 of the coordinate transforming unit 300 of FIG. 6 are most clearly illustrated by the timing chart of FIG. 12. The timing of the central processing unit operation of the coordinate transforming unit 300 is controlled by the timer 310. During the time period between $T_1$ and $T_2$ the CPU 304 calculates the coordinates of the display data $(x_a', y_a')$ for each point $(x_a, y_a)$ of the map and the calculated display data are transferred to the display memory 20. The coordinate transformation program is executed in the CPU 304 following which the CPU 204 proceeds to execute steps 2042 and 2044 (see FIG. 10) during the time interval between $T_2$ and $T_3$. Generally, the time interval between $T_2$ and $T_3$ is much shorter than the data transformation time $T_1$-$T_2$, and thus it is shown expanded in FIG. 12. Although not shown, plural cycles of operation of the flowchart of FIG. 10 may be carried out between intervals $T_2$ and $T_4$. In order to prevent the program execution by CPU 204 of steps 2042 and 2044 during the data transformation program of line 215 is closed by being kept in a "busy" state, while the central processing unit 304 of the coordinate transforming unit 300 executes the coordinate transformation program. As long as the bus line 215 is thus closed, the central processing unit 204 loops in step 2040 to repeatedly check the bus line 215. The bus line 215 is made available by the CPU 304 upon completion of its current calculation and the data transfer to the display memory 20. In response to the opening of the bus line 215, the display program as set forth is executed in the central processing unit 204 during the interval between $T_2$ and $T_3$. At the time $T_4$ the CPU 304 reads current input data $(S_v, S_r, S_k)$ and transforms the map to display coordinate data transformations.

Figure 13:
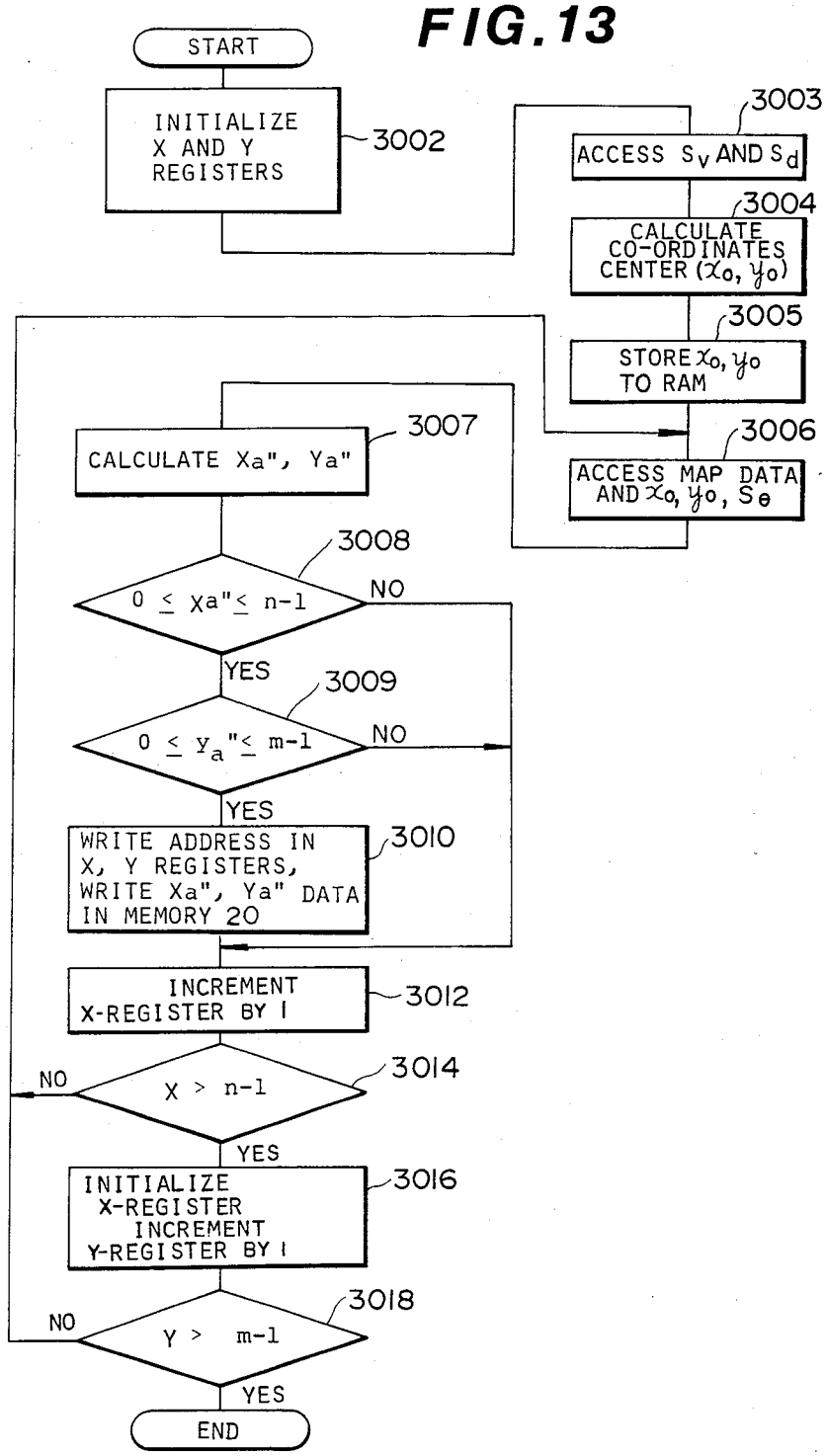
FIG. 13 is a flowchart of a coordinate transformation program executed by the coordinate transforming unit of FIG. 1.
Figure 14:
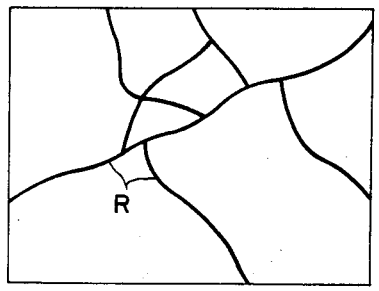
FIG. 14 shows the map as initially stored in a map memory and displayed on the display screen.

Now, the transforming operation of the coordinate transforming unit 300 will be described in more detail with reference to FIGS. 12 to 16. FIG. 13 shows a flowchart of the operation of the coordinate transforming unit 300. In the initial position, the map memory 10 stores the data to be displayed on the display screen, as shown in FIG. 14. The joy stick of the input unit 400 is then operated to move the cursors 34 on the display screen to identify the coordinates of the vehicle starting point P and the coordinates of the destination D on the display screen. In practice, since the map stored in the map memory 10 is provided with its y-axis aligned with true north, the vehicle position mark V, which has a generally pentagon-shaped image pointing in the vehicle travelling direction, will not always lie parallel to the vehicle travelling direction. Here, assuming the coordinates of the identified vehicle position P is $x_s$, $Y_s$ and the coordinates of the destination D is $x_d$ and $y_d$, the midpoint coordinates $x_i$ and $y_i$ with respect to the map coordinates in the map memory 10 can be obtained from the following equations:

$$x_i = \frac{x_s + x_d}{2}$$

$$y_i = \frac{y_s + y_d}{2}$$

Figure 15:
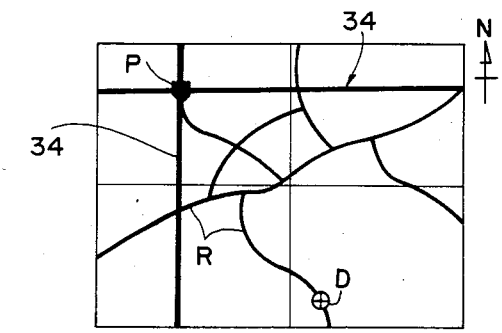
FIG. 15 is an illustration similar to FIG. 9 showing one way of determining the initial vehicle position and the destination.
Figure 16:
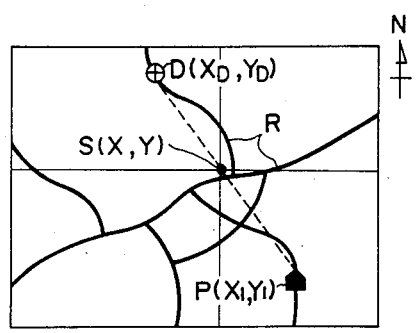
FIG. 16 shows a transformed map displayed on the display screen.

Further, assuming that the vehicle is travelling south, as shown in FIGS. 14 and 15, the coordinate axes on the display screen must be rotated through 180°, yielding the display image shown in FIG. 16. At the same time, since the midpoint ($x_i$, $y_i$) in the map coordinates must be the origin of the display coordinates, the display coordinates must be shifted according to the foregoing manner, as shown in FIG. 5.

Initially, the coordinate transforming program is executed under control of the timer 310.

It should be noted that the initial vehicle position coordinates ($x_s$, $y_s$) and the destination coordinates ($x_d$, $y_d$) are stored in the register 308 in the coordinate transforming unit 300. The current vehicle position coordinates ($x_v$, $y_v$) and vehicle travelling direction data represented by the travelling direction signal $S_\theta$ are fed to the RAM 312 via the interface 302. Furthermore, the coordinates transforming program is stored in the transforming program memory 306 and used on a time-sharing basis under control of the timer 310. The timer controls the transforming operation according to the timing chart illustrated in FIG. 12. In response to the timer signal $S_t$, the CPU 304 of the coordinate transforming unit 300 reads out and executed the coordinates transforming program to transform the coordinates of each point on the map.

Immediately after the start of execution of the coordinates transforming program shown in FIG. 13, an x-register 314 and a y-register 316 are initialized at a block 3002. Then, at a block 3003, the vehicle position signal $S_v$ representative of the current vehicle position coordinates $x_v$ and $y_v$, and the destination coordinates $x_d$ and $y_d$ are read out from the RAM 312. Based on the data read out from the RAM 312, the map coordinates of the center of the display is calculated in a block 3004. In the block 3004, the CPU processes the vehicle position signal $S_v$ and the destination signal $S_d$ according to the equations:

$$x_0 = \frac{x_d + x_v}{2}$$

$$y_0 = \frac{y_d + y_v}{2}$$

The obtained center coordinates $x_0$ and $y_0$ in the map coordinates are then stored in the RAM 312 at a block 3005.

At a block 3006, map data stored in the map memory 10, the travelling direction signal $S_\theta$, and the center coordinates $x_0$ and $y_0$ are read out. Based on the read out data, the CPU 304 transforms the coordinates ($x_a$, $y_a$) of each point on the map one by one. In the block 3007, the CPU 304 then processes the read data according to the following equations:

$$X_a'' = (X_a-X_o) \cos \theta + (Y_a-Y_o) \sin \theta$$

$$Y_a'' = (X_a-X_o) \sin \theta + (Y_a-Y_o) \cos \theta$$

Thereafter, at a block 3008, the address of the X-register 314 is checked to see if the obtained value $x_a''$ is within the range $0 \leq x_a'' \leq n-1$. If the obtained coordinate $x_a''$ is within the range, the obtained coordinate $y_a''$ is checked, at a block 3009 to see if the obtained value $y_a''$ is within the range $0 \leq y_a'' \leq m-1$. If the condition in the block 3009 is satisfied, the coordinates ($x_a''$, $y_a''$) are stored in the X-register 314 and Y-register 316 respectively and the map data corresponding to the point ($x_a$, $y_a$) are transferred to the display memory 20 at the address corresponding to the point ($x_a''$, $y_a''$) at a block 3010.

After the block 3010, the value of the X-register 314 is incremented by 1, at a block 3012. Then, the X-coordinate value is checked to see whether it is larger than (n−1) at a block 3014. If the condition in block 3014 is satisfied, the value of X is reset to zero and value Y representative of the coordinate stored in the Y-register is incremented by 1, at a block 3016. Thus, the value Y is checked to see if it is larger than (m−1) at a block 3018 and, if so, the coordinates transformation program ends.

If the condition of either one of the blocks 3008 and 3009 is not satisfied, the program jumps to the block 3012 to increment the value X and to proceed to block 3014. In this case, the addresses ($x_a''$, $y_a''$) are not written in the X-register and Y-register 314 and 316. When the condition in the block 3014 is not satisfied, the program returns to the block 3006 to repeat execution of the blocks 3007 to 3014. When the register value X becomes greater than (n−1), the display memory 20 shifts to the next adjacent row which corresponds to the register value Y being incremented by 1 and the register value X being initialized to re-start the data transforming operation from the first column in the next row of the display memory address, at the block 3016. If the condition in the block 3018 is not satisfied, the program returns to the block 3006 to perform the transforming operation for the next row.

Thus, by execution of the coordinates transformation program in the coordinates transformation program memory 306, the map data in the display memory 20 are updated. As shown in FIG. 12, after completion of the coordinates transformation program, the bus line 215 opens to permit the map data in the display memory 20 to be transferred to update the map data in the display memory 214 in the display control unit 200 as shown in FIG. 11.

Figure 17:
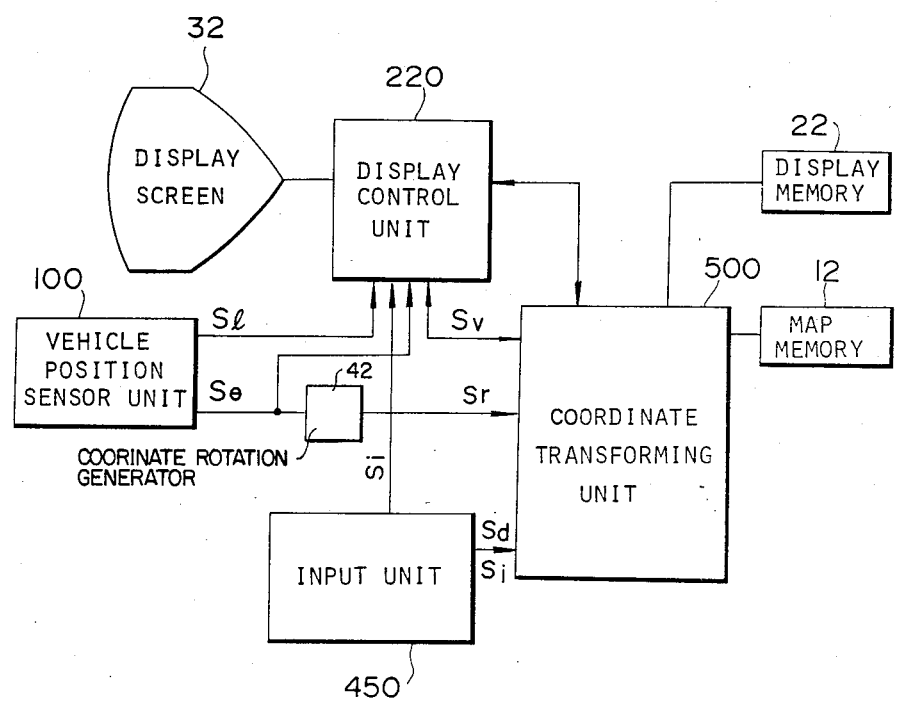
FIG. 17 is a schematic block diagram of a second embodiment of the drive map display system according to the present invention.

FIG. 17 illustrates the general structure of another embodiment of a map display system according to the present invention. In this embodiment, the coordinate transforming unit using the microcomputer in the foregoing embodiment is replaced by a coordinate transforming unit 500. Otherwise, the components of FIG. 17 are similar to the corresponding components of FIG. 1.

As in the embodiment of FIG. 1, the road map is stored in a map memory 12. The map data in the map memory 12 is transferred to the display memory 22 via a coordinate transforming unit 500. The display memory 22 is adapted to temporarily store the map data to be displayed on a display screen 32. The data stored in the display memory 22 is read out and transferred to a display control unit 220 via the coordinate transforming unit 500. The display control unit 220 controls transfer of map data from the map memory 12 to the display memory for display on the display screen 32.

A vehicle position sensor unit 150 is connected to the display control unit 220. The vehicle position sensor unit 150 is adapted to detect the distance travelled by the vehicle from a starting point and the travelling direction of the vehicle with respect to the coordinate system of the map stored in the map memory 12. The vehicle position sensor unit 150 produces a travelling distance signal $S_l$ and a travelling direction signal $S_\theta$ respectively having values representative of the travelling distance by the vehicle and the angle of offset of the vehicle travelling direction with respect to the map coordinates. The vehicle position sensor unit 150 is further connected to a coordinate rotation signal generator 42 to send the travelling direction signal $S_\theta$. The travelling direction signal $S_\theta$ is fed to the coordinate transforming unit 500 for use in rotating the coordinate axes of the display memory data such that the y-axis thereof lies parallel to the direction of the travel of the vehicle.

The coordinate transforming unit 500 is further connected to an input unit 450 for inputting the coordinates of the position of the vehicle and its destination. Based on the predetermined coordinates of the vehicle position and its destination, the initial center of the display is determined. With the initial display center determined and the vehicle direction detected by the vehicle position sensor unit 150, the coordinate transforming unit 500 determines the orientation of the coordinate axes of the map to be displayed in relation to the coordinate system of the map memory 12.

The coordinate transforming unit 500 sequentially transforms all of the map points in order to adapt the coordinates of each map point to the determined coordinate axes for display on the display screen 32. As the vehicle moves, the vehicle position sensor unit 150 sequentially produces the travelling distance pulses $S_l$ and the travelling direction signal $S_\theta$. The display control unit 220 receives the travelling distance signal $S_l$ and the travelling direction signal $S_\theta$ and processes them to determine the coordinates of the present vehicle position. The display control unit 220 produces a vehicle position signal $S_v$ representative of the x- and y-coordinates of the vehicle in the display coordinates at given intervals. The vehicle position signal $S_v$ thus contains an x-component and a y-component respectively representative of the x-coordinate ($x_v$) and the y-coordinate ($y_v$) of the vehicle position and is fed to the coordinate transforming unit 500. The coordinate transforming unit 500 also receives the rotation signal $S_r$ from the coordinates rotation signal generator 42. Based on the vehicle position signal $S_v$ and rotation signal $S_r$, the coordinate transforming unit 500 performs a data transformation to displace the display center and thereby shift the display coordinates and rotate the axes of the coordinates to align the y-axis of the coordinates parallel to the vehicle travelling direction.

The circuitry and function of the coordinate transforming unit 500 will be described in detail below with reference to FIGS. 18 to 20.

Figure 18:
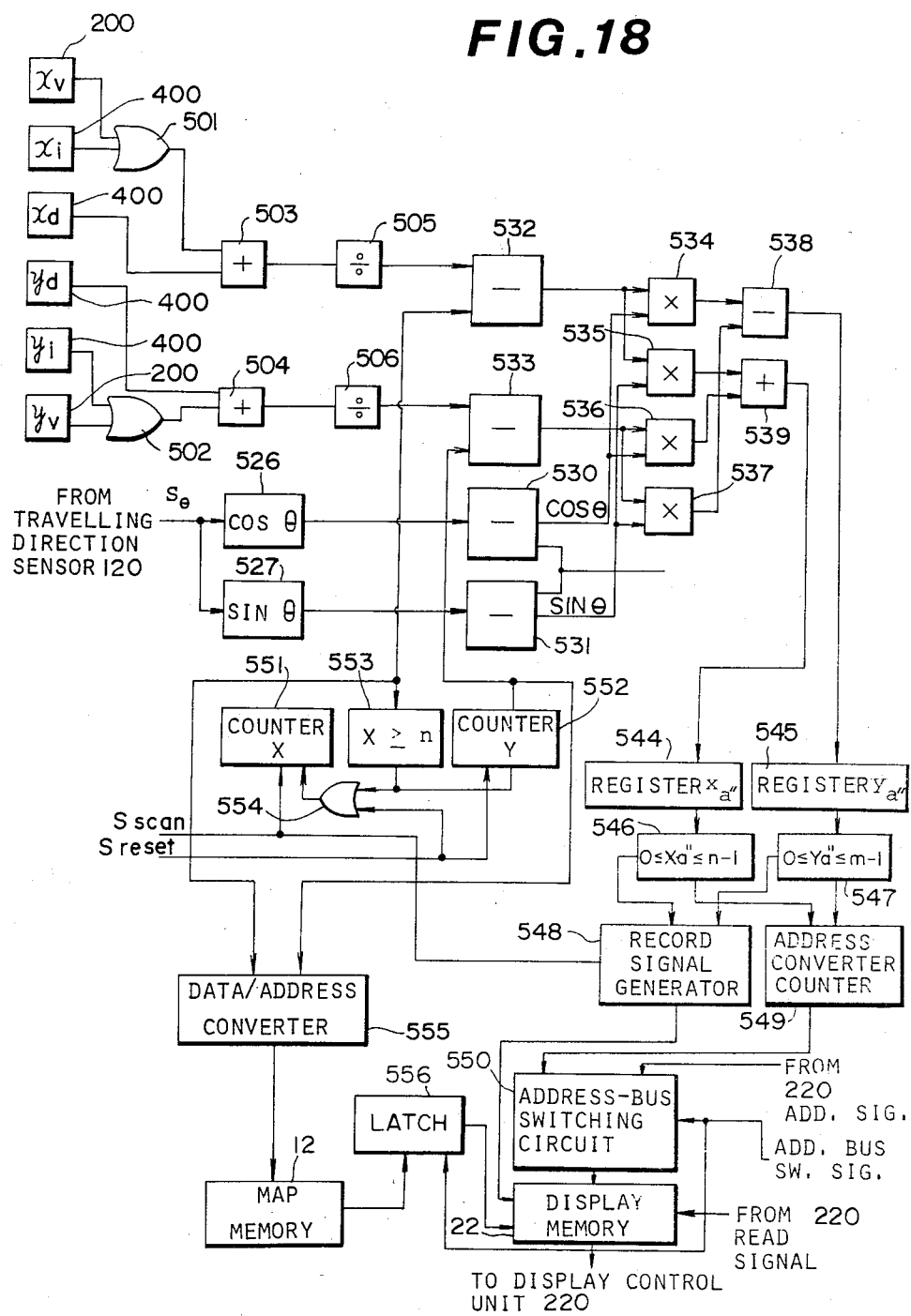
FIG. 18 is a block diagram of the coordinate transforming unit in the drive map display system of FIG. 17.
Figure 19:
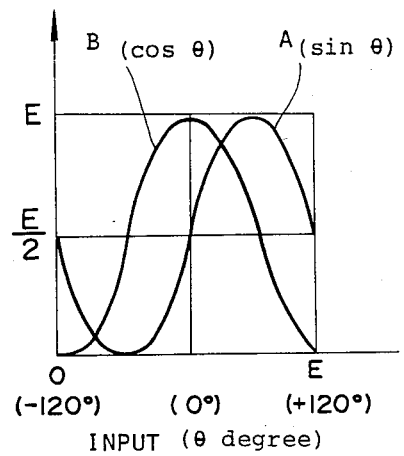
FIG. 19 shows the sine and cosine values of an offset angle representively produced by a sine signal generator and a cosine signal generator in the drive map display system of FIG. 18.

FIG. 18 is a detailed block diagram of the circuitry of the coordinate transforming unit 500 of FIG. 17.

A number of signals are generated for input to the coordinate transforming unit 500. The signals include a vehicle position signal $S_v$ produced by the display control unit 200, the initial vehicle position signal $S_i$ produced by the input unit 400, and the vehicle travelling direction signal $S_\theta$ produced by the vehicle position sensor unit 100. The vehicle position signal $S_v$ x-component $x_v$ and y-component $y_v$ produced by the display control unit 200 are sent to corresponding OR gates 501 and 502. Likewise, the initial vehicle position signal $S_i$ x-component ($x_i$) and y-component ($y_i$) produced by the input unit 400 are fed to the OR gates 501 and 502. The OR gates 501 and 502 are respectively connected to adders 503 and 504. The x-component ($x_d$) and y-component ($y_d$) of a destination signal $S_d$ produced by the input unit 400 are conducted to the adders 503 and 504, respectively. Therefore, the adder 503 and 504 respectively obtain sums of $x_v$ or $x_i$ and $x_d$ and $y_v$ or $y_i$ and $y_d$. The outputs of the adders 503 and 504 are fed to dividers 505 and 506. In the divider 505 and 506, the sums obtained by the adders 503 and 504 are divided by 2 to obtain the coordinate values corresponding to the point halfway between the vehicle position and the destination. Therefore, the outputs of the dividers 505 and 506 respectively represent x-component $x_i$ and y-component $y_i$ of the point halfway between the vehicle position and the destination.

On the other hand, the travelling direction signal $S_\theta$ is fed to a cosine generator 526 and a sine generator 527. The cosine generator 526 and sine generator 527 have input-output characteristics as shown by the graphs in FIG. 19. The characteristics of the curves A ($\sin \theta$) and B ($\cos \theta$) can be realized by a square wave approximation circuit including diodes. Since the curves A and B have an offset value of E/2, the corrected $\cos \theta$ and $\sin \theta$ can be obtained by subtracting the digital value corresponding to E/2 by subtractors 503 and 531 after their digital conversion.

Referring to FIG. 18, subtractors 532 and 533 calculate ($x_a$-$x_i$) and ($y_a$-$y_i$) for use in the equation:

$$x_a'' = (x_a-x_i) \cos \theta + (y_a-y_i) \cos \theta$$

$$y_a'' = (x_a-x_i) \sin \theta + (y_a-y_i) \cos \theta$$

Multipliers 534, 536, and 537, respectively calculate the terms ($x_a$-$x_i$) $\cos \theta$, ($x_a$-$y_i$) $\sin \theta$, ($y_a$-$y_i$) $\cos \theta$ and ($y_a$-$y_i$) $\sin \theta$ in the above equations. In the next stage, subtractors 538 and 539 output $$x_a'' = (x_a-x_i) \cos \theta + (y_a-y_i) \sin \theta \text{ and}$$
$$y_a'' = (x_a-x_i) \sin \theta + (y_a-y_i) \cos \theta.$$

The coordinates ($x_a''$, $y_a''$) in the display coordinate system are then stored in an $X_a''$-register 544 and a $Y_a''$-register 545, respectively. Next, the coordinate values $x_a''$ and $y_a''$ are checked by limit circuits 546 and 547 respectively whether the obtained transformed coordinates ($x_a''$, $y_a''$) are within the extent, i.e. the display screen of "m" rows and "n" columns. Only the coordinates ($x_a''$, $y_a''$) falling within the display screen are converted to a memory address by an address convertor 549 so as to specify the corresponding address in the display memory 22 through an address-bus switch circuit 550.

In addition, when the limit circuits 546 and 547 determine that the point ($x_a'$, $y_a'$) lies within the display screen, a memory recording signal generator 548 outputs a record command for recording the data in the address in the display memory 22 specified by the address signal from the address convertor 549.

On the other hand, in order to read out the data from the map memory 12, there is a read-out means comprising an X counter 551 which counts scanning pulses $S_{scan}$ applied with a constant period and outputs a value $x_a$, a discriminator 553 which discriminates whether the count value $x_a$ repeatedly outputted coincides with a predetermined value and outputs a pulse when the count coincides with the predetermined value, a Y counter 552 which counts the pulses from the discriminator 553 and outputs a value $y_a$, and an OR gate 54 which resets the X counter 551 in response to a pulse from the discriminator 553 or a reset pulse $S_{reset}$. The Y counter 552 is also reset by the reset pulse $S_{reset}$.

Figure 20:
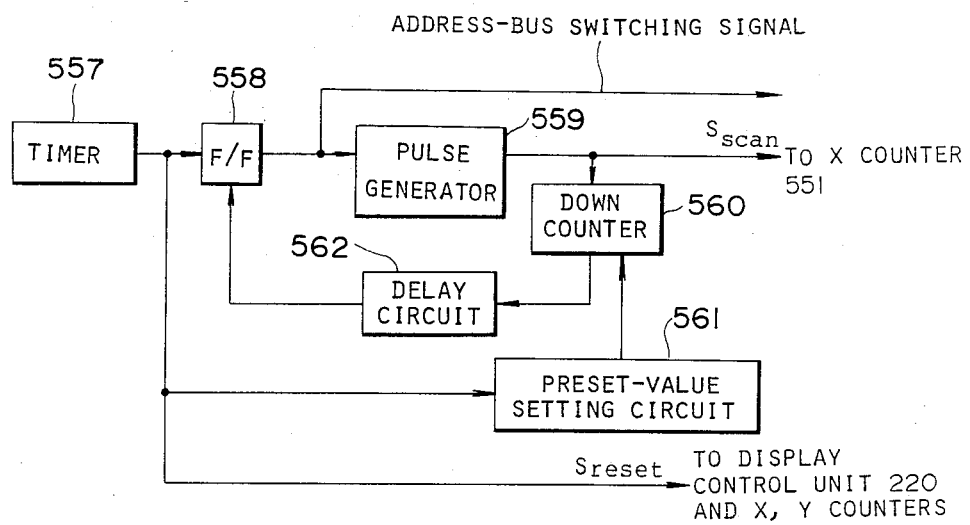
FIG. 20 is a block diagram of a timing control circuit associated with the coordinate transforming unit of FIG. 18.

A means for generating the reset pulse $S_{reset}$ and the scanning pulse $S_{scan}$ to read out the data stored in the map memory 12 is constructed as shown in FIG. 20.

Referring to FIG. 20, the reference numeral 557 denotes a timer which generates a pulse signal which switches at regular intervals between a mode for transforming and recording the data stored in the map memory 12 into the coordinates of the display memory 22, and another mode for displaying the data stored in the display memory 22 on the display screen 32. Thus, a flip-flop 558 is actuated by the output pulse from the timer 557, thereby switching between the transforming and recording modes. Alternatively, the flip-flop 558 is reset by the output pulse, thereby switching to the mode for display. Whenever the flip-flop 558 is actuated, it outputs a signal as an address-bus switching signal to the address-bus switch circuit 550 and a latch 556 for detecting and latching the data to be displayed so as to allow for the recording of the data from the map memory 12 into the display memory 22 at the address specified by counters 546 and 545. In this manner, the data bits of the map memory 12 are stored at addresses which correspond to the transferred coordinates ($x_a''$, $y_a''$). The data in the display memory 22 is thus effectively translated and rotated with respect to the data in the map memory 12.

A pulse generator 559 is actuated by the set output from the flip-flop 558, thereby generating a plurality of scanning pulses $S_{scan}$ at a constant period, which are conducted to the display control unit 220 to activate the scanning beam of the display screen 32. A down-counter 560 decrements a value set by a pre-set value setting circuit 561 (when the display screen is "m" rows and "n" columns, the set value is "m×n−1") in accordance with the scanning pulse $S_{scan}$. When the counted value coincides with zero, a signal is sent to a delay circuit 562 which outputs a pulse which is delayed by a predetermined period to the flip-flop 558 so as to reset it and switch to the mode for displaying. The predetermined delay periods in the delay circuit 562 permits time for completion of the recording of the data in the display memory 22.

What is claimed is:

1. A road map display system for an automotive vehicle comprising:

a first memory storing map image data arranged in a map coordinate system having an x-axis and a y-axis;

a first sensor for detecting the position of a vehicle in said map coordinate system and producing a first sensor signal representative of the detected vehicle position;

a second sensor for detecting the direction of vehicle travel and producing a second signal representative of the angular offset between the detected direction and the axes of the map coordinate system;

first means for determining the map coordinates of a destination and producing a third signal representative of the position of the determined destination;

second means for determining the origin of a second coordinate system having an x-axis and a y-axis in accordance with both said first sensor signal and said third signal and aligning the y-axis of said second coordinate system parallel to the detected direction of travel;

third means for transforming the coordinates of said map image data in said first memory to said second coordinate system;

a second memory storing at least part of the map image data in the second coordinate system; and fourth means, incorporating a display screen, for displaying the map image data stored in said second memory and symbols representing the information indicated by said first, second, and third signals.

2. The display system as set forth in claim 1, wherein said map data coordinate transforming means transforms the map data coordinates in accordance with said first sensor signal and said third signal such that the point halfway between said vehicle position and said destination coincides with the origin of said second coordinate system.

3. The display system as set forth in claim 1, which further comprises means for controlling said fourth means, said controlling means co-operatively associated with said third means to update the contents of said second memory with the map image data in said first memory at a predetermined timing in relation to operation of said map data coordinate transforming means and to control said fourth means in coordination with the updating of said second memory.

4. The display system as set forth in claim 1, wherein said third means periodically updates said map image data in said second memory and further includes means for determining whether a set of transformed map image data coordinates fall outside of the display capacity of said display unit and for inhibiting updating of said second memory when said transformed map image data coordinates fall outside of the display capacity of said fourth means.

5. The display system as set forth in claim 4, wherein said first and second memories are digital memories for storing the map image data in digital form.

6. The display system as set forth in claim 5, wherein said map data coordinate transforming means repeatedly performs coordinate transformation and display capacity check for each memory address in said first memory and writes the map data at an address in said second memory corresponding to each memory address in said first memory.

7. A method for displaying a road map with superimposed symbols representing the positions of a vehicle and its destination on a display screen, comprising the steps of:

storing first map image data of said road map in a first coordinate system;

detecting vehicle position and direction of travel in relation to said first coordinate system;

inputting the location of the destination in terms of said first coordinate system;

establishing a second coordinate system based on the determined vehicle position, direction of travel and the destination coordinates such that one axis of said second coordinate system lies parallel to the direction of travel and the origin thereof is centered on a point halfway between the vehicle position and the destination;

transforming said first map image data with respect to said second coordinate system to obtain second map image data; and displaying said second map image data on said display screen in conjunction with symbols representing vehicle position and direction of travel and the destination.

8. A method as set forth in claim 7, which further includes a step for inputting an initial vehicle position in said first coordinate system.

9. A method as set forth in claim 8, wherein detection of the vehicle position is performed by monitoring vehicle travel distance and direction from a starting point.

10. A method as set forth in claim 9, wherein the map data transforming step is repeatedly performed for all of the first map image data.

11. A method as set forth in any one of claims 7 to 10, which further includes a step for determining whether the transformed coordinates of the first map image data fall outside of a display screen and in such cases inhibiting updating of the display with the second map image data.

12. A method as set forth in claim 11, wherein said transforming step is repeated a predetermined number of times corresponding to the number of second map image data.

* * * * *